US012413028B2

(12) United States Patent
Horning et al.

(10) Patent No.: US 12,413,028 B2
(45) Date of Patent: Sep. 9, 2025

(54) PANEL MOUNT ELECTRICAL CONNECTOR

(71) Applicant: TE Connectivity Solutions GmbH, Schaffhausen (CH)

(72) Inventors: Michael James Horning, Landisville, PA (US); Brian Patrick Costello, Scotts Valley, CA (US)

(73) Assignee: TE Connectivity Solutions GmbH

( * ) Notice: Subject to any disclaimer, the term of this patent is extended or adjusted under 35 U.S.C. 154(b) by 509 days.

(21) Appl. No.: 17/867,583

(22) Filed: Jul. 18, 2022

(65) Prior Publication Data

US 2023/0114958 A1 Apr. 13, 2023

Related U.S. Application Data

(60) Provisional application No. 63/253,776, filed on Oct. 8, 2021.

(51) Int. Cl.

*H01R 13/504* (2006.01)
*H01R 13/74* (2006.01)
*H01R 13/26* (2006.01)

(52) U.S. Cl.

CPC ......... *H01R 13/743* (2013.01); *H01R 13/504* (2013.01); *H01R 13/26* (2013.01)

(58) Field of Classification Search

CPC ..... H01R 13/743; H01R 13/504; H01R 13/26
USPC .......................................................... 439/544
See application file for complete search history.

(56) References Cited

U.S. PATENT DOCUMENTS 6,174,185 B1 * 1/2001 Cecil, Jr. .............. H01R 13/743 439/248
6,450,834 B1 * 9/2002 Polgar .................... H01R 13/74 439/546
7,168,978 B1 * 1/2007 Trout ................... H01R 13/743 439/545
7,597,587 B1 * 10/2009 Duesterhoeft ....... H01R 13/745 439/545
10,581,196 B2 * 3/2020 Liu ...................... H01R 25/162

* cited by examiner

*Primary Examiner* — Tulsidas C Patel
*Assistant Examiner* — Thaslimur Rahman

(57) ABSTRACT

An electrical connector includes a connector housing having a base, a flange, and a plug. The connector housing has a contact channel holding a contact. The electrical connector includes a latch member integral with the connector housing and located within the flange. The latch member includes a deflectable latch arm and a latching finger extending from the latch arm. The plug is configured to be inserted into a panel opening of the panel in a loading direction. The connector housing is movable laterally relative to the panel in a latching direction to a latched position. The plug is movable in the panel opening in the latching direction. The latching finger engages an inner edge of the panel opening when the housing is in the latched position to hold the connector housing in the latched position.

20 Claims, 7 Drawing Sheets

PANEL MOUNT ELECTRICAL CONNECTOR

CROSS REFERENCE TO RELATED APPLICATIONS

This application claims benefit to U.S. Provisional Application No. 63/253,776, filed 8 Oct. 2021, titled "PANEL MOUNT ELECTRICAL CONNECTOR", the subject matter of which is herein incorporated by reference in its entirety.

BACKGROUND OF THE INVENTION

The subject matter herein relates generally to electrical connectors.

In general, electrical connectors are used to electrically connect components. The electrical connectors may transmit data signals and/or power between the electrical components. Typically, the electrical connector includes one or more contacts held in a housing. The electrical connector is mated to a mating component, such as another electrical connector or a busbar.

In at least some electronic systems, the electrical connectors are mounted to a connector panel for mating with a complementary mating connector. The connectors are mounted to the connector panel using a variety of methods such as brackets, clamps, threaded bolts, or other fasteners. The additional securing components add to the cost and complexity of assembly. Additionally, with the continuously increasing demand for resources in today's systems, connector space on the connector panels is in short supply. In many instances, due to space limitations, system operators limit the amount of connector space available for each application. In addition to the size of the connectors, features that may be provided for particular mounting arrangements may also contribute to space shortages on the connector panel by increasing the space required between connectors.

A need remains for an electrical connector having a small footprint to facilitate saving space on the connector panels. It would be further desirable to provide an electrical connector that is mountable to the panel without the need for tools or mounting hardware.

BRIEF DESCRIPTION OF THE INVENTION

In one embodiment, an electrical connector is provided for mounting to a panel. The electrical connector includes a connector housing having a base, a flange, and a plug. The connector housing has a contact channel holding a contact. The electrical connector includes a latch member integral with the connector housing and located within the flange. The latch member includes a deflectable latch arm and a latching finger extending from the latch arm. The plug is configured to be inserted into a panel opening of the panel in a loading direction. The connector housing is movable laterally relative to the panel in a latching direction to a latched position. The plug is movable in the panel opening in the latching direction. The latching finger engages an inner edge of the panel opening when the housing is in the latched position to hold the connector housing in the latched position.

In another embodiment, an electrical connector system includes a panel and an electrical connector mounted to the panel. The panel has an inner edge defining a panel opening. The panel opening includes a main pocket and a latching pocket extending from the main pocket. The electrical connector includes a connector housing that has a base at a rear of the connector housing, a flange extending from the base, and a plug extending forward of the base and the flange at a front of the connector housing for mating with a mating electrical connector. The connector housing has a contact channel through the base and the plug. The electrical connector includes a contact received in the contact channel having a mating end and a cable end configured to be terminated to a cable. The electrical connector includes a latch member integral with the connector housing and located within the flange. The latch member includes a latch arm being deflectable relative to the connector housing. The latch member includes a latching finger extending from the latch arm. An electrical connector system includes the plug of the connector housing that is inserted into the main pocket of the panel opening in a loading direction. The connector housing is movable laterally relative to the panel in a latching direction to a latched position. The latching direction differs from the loading direction. The plug is movable in the main pocket in the latching direction. The latching finger is received in the latch pocket in the latched position and engaging the inner edge of the panel opening in the latched position to hold the connector housing in the latched position.

DETAILED DESCRIPTION OF THE INVENTION

Figure 1:
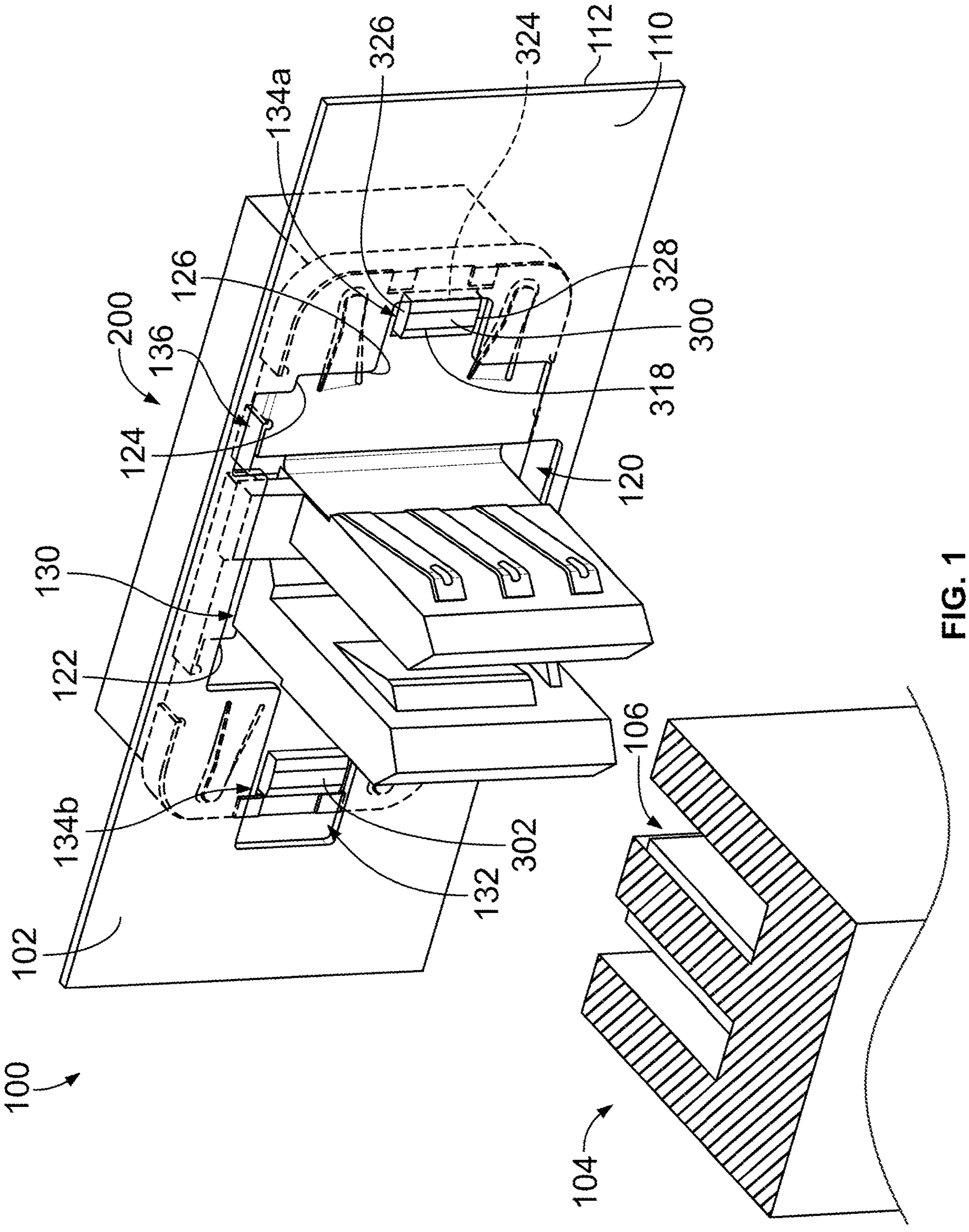
FIG. 1 illustrates an electrical connector system in accordance with an exemplary embodiment.

FIG. 1 illustrates an electrical connector system 100 in accordance with an exemplary embodiment. The electrical connector system 100 includes a panel mounted electrical connector 200 mounted to a panel 102. The electrical connector 200 is configured to be electrically connected to a mating electrical connector 104. In the illustrated embodiment, the mating electrical connector 104 is a power connector configured to supply power to the electrical connector 200. For example, the mating electrical connector 104 includes a busbar 106 supplying power to the electrical connector 200. Other types of mating electrical connectors 104 may be used in alternative embodiments, such as a data communication connector configured to transmit electrical signals between the mating electrical connector 104 and the electrical connector 200. In various embodiments, the mating electrical connector 104 may transmit power and data to the electrical connector 200.

The panel 102 may be a chassis, a frame, a housing, or other component of the electrical connector system 100. In an exemplary embodiment, the panel 102 is planar having a front surface 110 and the rear surface 112. In various embodiments, the panel 102 is electrically conductive and may be electrically grounded. For example, the panel 102 may be a piece of sheet metal. The electrical connector 200 may be electrically communed with the panel 102.

The panel 102 includes a panel opening 120 therethrough. The electrical connector 200 is mounted to the panel 102 at the panel opening 120. For example, a portion of the electrical connector 200 may pass through the panel opening 120 for mating with the mating electrical connector 104. In an exemplary embodiment, a portion of the electrical connector 200 is coupled to the rear surface 112 and a portion of the electrical connector 200 is coupled to the front surface 110. The panel 102 is captured between features of the electrical connector 200 such that the electrical connector 200 is fixed in position at the panel 102 for mating with the mating electrical connector 104.

In an exemplary embodiment, the electrical connector 200 may be latchably coupled to the panel 102. For example, the electrical connector 200 includes one or more latching features that are latchably coupled to the panel 102. In an exemplary embodiment, the electrical connector 200 is mounted to the panel 102 without the use of tools or mounting hardware. In an exemplary embodiment, the electrical connector 200 is a slide-to-latch electrical connector configured to be loaded through the panel opening 120 to a nominal position and then slid in a latching direction to a latched position. Integral features of the electrical connector 200 engage the panel 102 to secure the electrical connector 200 to the panel 102.

The panel opening 120 is defined by an inner edge 122 surrounding the panel opening 120. In the illustrated embodiment, a single panel opening 120 is provided. However, the panel 102 may include multiple panel openings 120 in alternative embodiments. In an exemplary embodiment, the inner edge 122 is polygonal, having a plurality of straight-line segments 124 meeting at corners 126. However, the panel opening 120 may have other shapes in alternative embodiments, including curved segments.

The panel opening 120 includes a main pocket 130 and one or more side pockets 132 extending from one or more sides of the main pocket 130. Portions of the electrical connector 200 are received in the main pocket 130 and the side pockets 132 during loading and coupling of the electrical connector 200 to the panel 102. The side pockets 132 are cutouts or notches in the panel 102 that open to the main pocket 130. The main pocket 130 is larger than any of the side pockets 132. Optionally, the main pocket 130 may occupy a majority of the panel opening 120. In an exemplary embodiment, the side pockets 132 include one or more latch pockets 134 and one or more tab pockets 136. In the illustrated embodiment, the panel opening 120 includes a first latch pocket 134 at a first side of the main pocket 130 and a second latch pocket 134 at a second side of the main pocket 130. The panel opening 120 may include greater or fewer latch pockets 134 in alternative embodiments. The latch pockets 134 receive latches of the electrical connector 200. In the illustrated embodiment, the panel opening 120 includes an upper tab pocket 136 at the top side of the main pocket 130 and a lower tab pocket 136 at a bottom side of the main pocket 130. The panel opening 120 may include greater or fewer tab pockets 136 in alternative embodiments. The tab pockets 136 received tabs of the electrical connector 200.

Figure 2:
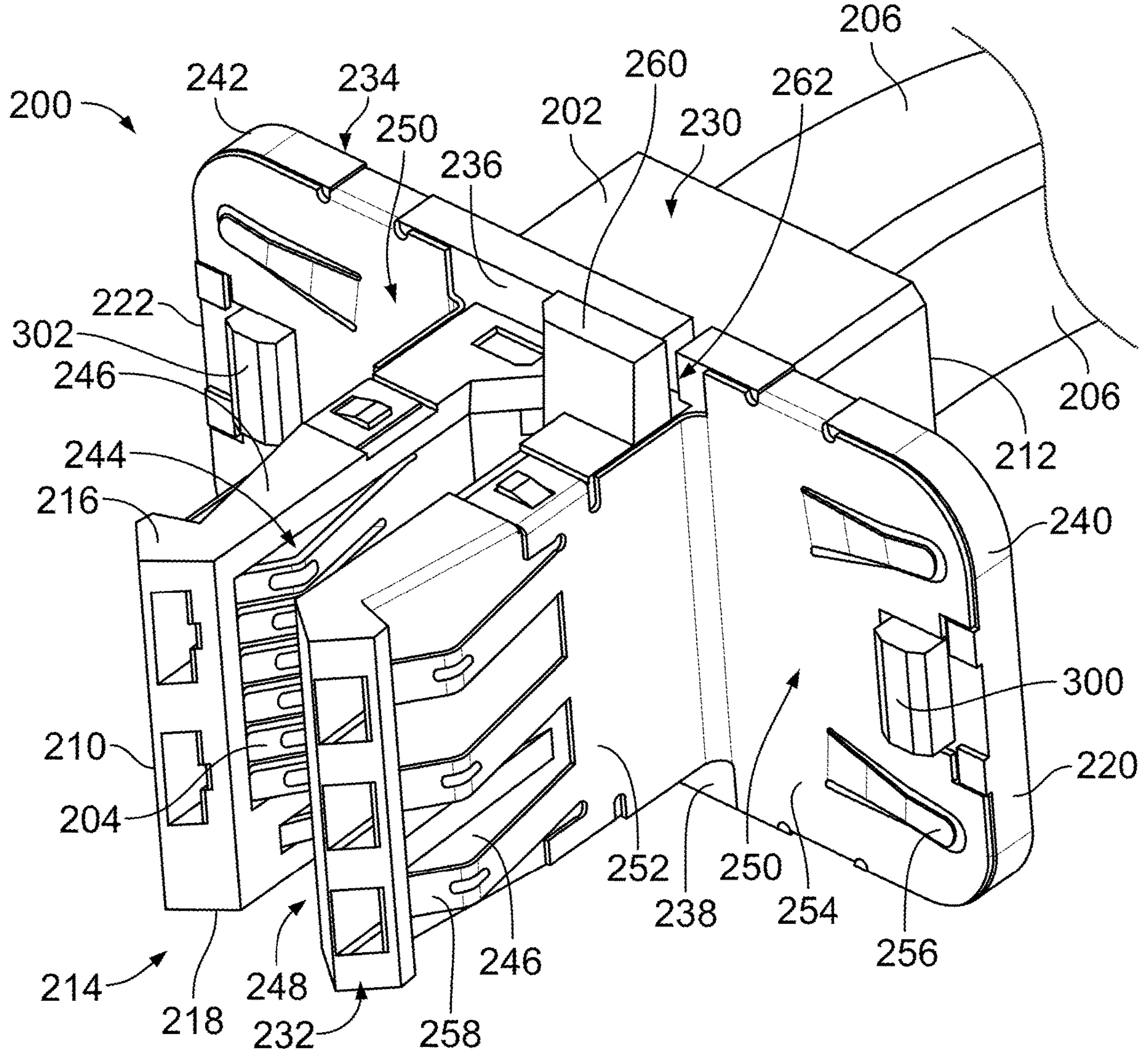
FIG. 2 is a front perspective view of the electrical connector in accordance with an exemplary embodiment.

FIG. 2 is a front perspective view of the electrical connector 200 in accordance with an exemplary embodiment. The electrical connector 200 includes a connector housing 202 holding one or more contacts 204. The contacts 204 are configured to be electrically connected to the mating electrical connector 104 (shown in FIG. 1). For example, the contacts 204 may be electrically connected to the busbar 106. In an exemplary embodiment, the contacts 204 are provided at ends of cables 206 extending from the connector housing 202. The connector housing 202 includes features used to secure the electrical connector 200 to the panel 102 (shown in FIG. 1).

The connector housing 202 includes a front 210 and a rear 212. In the illustrated embodiment, the front 210 defines a mating end 214 configured to be mated with the mating electrical connector 104. Optionally, the cables 206 may extend from the rear 212. The connector housing 202 includes a top 216 and a bottom 218. The connector housing 202 includes a first side 220 and a second side 222.

In an exemplary embodiment, the connector housing 202 includes a base 230 at the rear 212 and a plug 232 at the front 210. The connector housing 202 includes a flange 234 extending from the base 230. In various embodiments, the flange 234 may extend from the base 230 in all directions. For example, the flange 234 may include an upper flange portion 236 at the top 216, a lower flange portion 238 at the bottom 218, a left flange portion 240 at the left side 220, and a right flange portion 242 at the right side 222. The flange 234 is used for mounting the electrical connector 200 to the panel 102. For example, the flange 234 may face the rear surface 112 of the panel 102. The base 230 is located rearward of the flange 234, and is thus configured to be located behind the panel 102. The plug 232 extends forward of the flange 234, and thus is configured to be located forward of the panel 102. For example, the plug 232 is configured to extend through the panel opening 120 (shown in FIG. 1) for mating with the mating electrical connector 104.

In an exemplary embodiment, the cable housing 202 includes one or more contact channels 244 that receive corresponding contacts 204. The contact channels 244 extend into the base 230 and into the plug 232. The contacts 204 are configured to be terminated to the cable 206 in the base portion of the contact channels 244. The contacts 204 are configured to be mated with the mating electrical connector 104 in the plug portion of the contact channels 244.

In an exemplary embodiment, the plug 232 includes plug walls 246 forming a slot 248. The slot 248 is open at the front 210 to receive a portion of the mating electrical connector 104, such as the busbar 106. The contacts 204 are exposed within the slot 248 for mating with the mating electrical connector 104. In the illustrated embodiment, the slot 248 extend vertically from the top 216 to the bottom 218. Example, the slot 248 is open at the top 216 and open at the bottom 218. The slot 248 may have other shapes in alternative embodiments. In other alternative embodiments, a plurality of the slots 248 may be provided, such as individual slots for each of the contacts 204. For example, the slots 248 may define sockets or receptacles that receive individual contacts, such as pins, of the mating electrical connector 104. In the illustrated embodiment, the plug walls 246 are oriented vertically and provided at the first side 220 and the second side 222 of the plug 232. Additional plug walls 246 may be provided in alternative embodiments, such as horizontally extending plug walls.

In an exemplary embodiment, the electrical connector 200 includes one or more ground elements 250 coupled to the connector housing 202. The ground elements 250 are electrically conductive. In an exemplary embodiment, the ground elements 250 are stamped and formed from a metal sheets. The ground elements 250 are configured to be electrically connected to the panel 102 and configured to be electrically connected to the mating electrical connector 104. The ground elements 250 are used to electrically common the mating electrical connector 104 and the panel 102. In the illustrated embodiment, the electrical connector 200 includes a pair of the ground elements 250, provided at the first side 220 and the second side 222. Each ground elements 250 includes a plug wall 252 extending along the plug 232 and a flange wall 254 extending along the flange 234. The ground element 250 includes one or more panel tabs 256 extending from the flange wall 254 configured to engage the rear surface 112 of the panel 102. The panel tabs 256 are deflectable and extend out of the plane of the flange wall 254 to interface with the panel 102. The ground element 250 includes one or more mating tabs 258 extending from the plug wall 254 configured to engage the mating electrical connector 104. The mating tabs 258 are deflectable and extend out of the plane of the plug wall 252 to interface with the mating electrical connector 104. The ground elements 250 may be secured to the connector housing 202 using clips, brackets, fasteners, or other securing elements. The ground elements 250 may have other sizes, shapes, and/or features in alternative embodiments.

In an exemplary embodiment, the connector housing 202 includes one or more front tabs 260 extending from the connector housing 202 at or near the front 210. In various embodiments, the front tabs 260 may extend from the plug 232, such as the plug walls 246. The front tabs 260 are configured to engage the front surface 110 of the panel 102. In an exemplary embodiment, the front tabs 260 are integral with the connector housing 202. For example, the front tabs 260 may be co-molded with the connector housing 202. In an exemplary embodiment, the connector housing 202 includes an upper front tab 260 at the top 216 and a lower front tab (not shown) at the bottom 218. Optionally, the upper and lower front tabs 260 may be offset from each other, such as having the upper front tab 260 closer to the first side 220 and the lower front tab closer to the second side 222. The front tabs 260 are configured to be loaded through the panel opening 120 to the front side of the panel 102. When the electrical connector 200 is slid to the side relative to the panel 102 during mating, the front tabs 260 are configured to engage the panel 102 to secure the electrical connector 200 to the panel 102.

In an exemplary embodiment, a gap 262 is formed between the corresponding front tab 260 and the flange 234. The panel 102 is received in the gap 262. Optionally, the gap 262 may have a width approximately equal to the thickness of the panel 102 such that the panel 102 is tightly held between the front tab 260 and the flange 234. Optionally, slight clearance may be provided between the panel 102 and the front tab 260 and the flange 234 to avoid binding of the connector housing 202 on the panel 102, which allows the electrical connector 200 to slide to the latched position.

In an exemplary embodiment, the electrical connector 200 includes one or more latch members used to latchably secure the electrical connector 200 to the panel 102. For example, the electrical connector 200 may include a first latch members 300 at the left side and a second latch member 302 at the right side. The latch members 300, 302 are integral with the connector housing 202. For example, the latch members 300, 302 may be manufactured from the same dielectric material as the connector housing 202. In an exemplary embodiment, the latch members 300, 302 are co-molded with the connector housing 202. As such, the electrical connector 200 does not require separate mounting hardware for securing the electrical connector 200 to the panel 102. The latch members 300, 302 are configured to be latchably coupled to the panel 102 without the use of tools. For example, the electrical connector 200 may be a slide-to-latch electrical connector, wherein the electrical connector 200 is slid sideways along the panel 102 to the latched position. The latch members 300, 302 latchably engage the panel 102 in the latched position. In an exemplary embodiment, the latch members 300, 302 extend forward from the flange 234 and are configured to be received in the panel opening 120.

Figure 3:
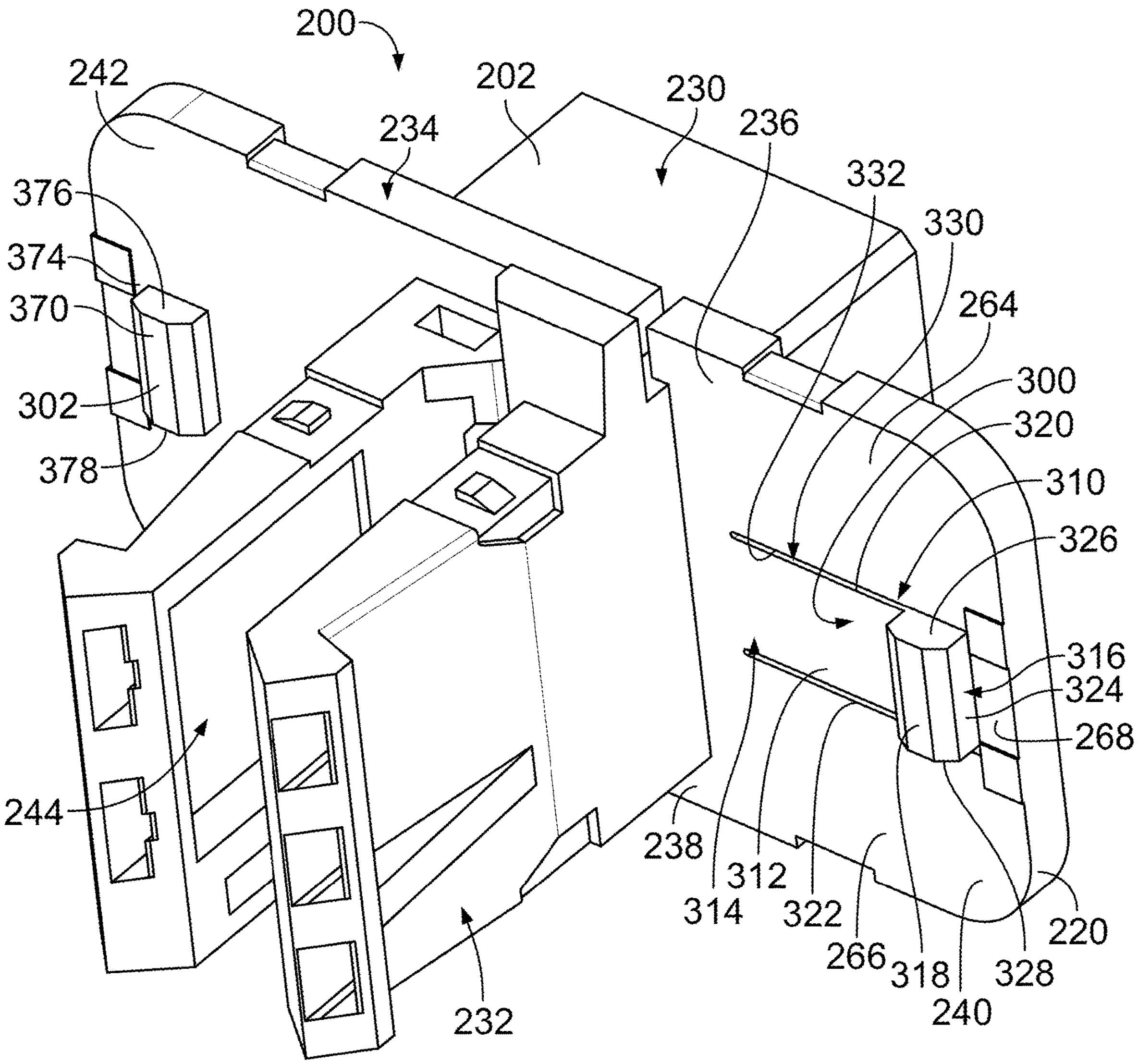
FIG. 3 is a front perspective view of a portion of the electrical connector showing the connector housing in accordance with an exemplary embodiment
Figure 4:
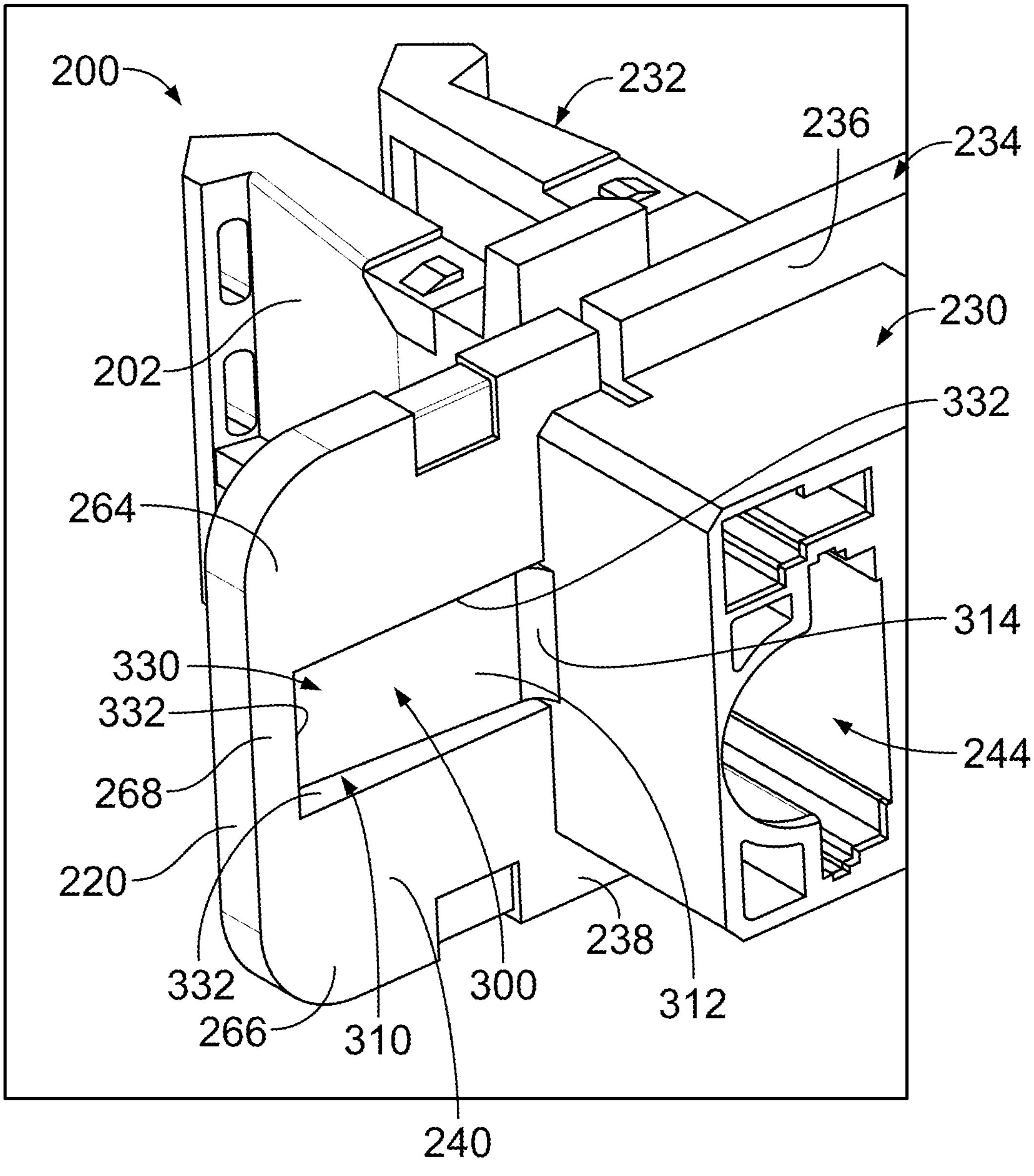
FIG. 4 is a rear perspective view of a portion of the electrical connector showing the connector housing with an exemplary embodiment.

FIG. 3 is a front perspective view of a portion of the electrical connector 200 showing the connector housing 202 in accordance with an exemplary embodiment. FIG. 4 is a rear perspective view of a portion of the electrical connector 200 showing the connector housing 202. FIGS. 3 and 4 illustrate the flange 234 located between the base 230 and the plug 232. FIGS. 3 and 4 illustrate the contact channels 244 extending through the connector housing 202, such as through the base 230 and the plug 232.

In an exemplary embodiment, the flange 234 includes the upper flange portion 236, the lower flange portion 238, the left flange portion 240, and the right flange portion 242. The upper front tab 260 is spaced apart from and faces the upper flange portion 236. The lower front tab (not shown) is spaced apart from and faces the lower flange portion 238. In an exemplary embodiment, the first latch member 300 is provided at the left flange portion 240 and the second latch member 302 is provided at the right flange portion 242. The latch members 300, 302 may be located proximate to the outer edges of the flange 234 such that the latch members 300, 302 have a large spacing therebetween.

In an exemplary embodiment, the latch member 300 is a deflectable latch member, which is movable relative to the connector housing 202 during mating to the panel 102. In an exemplary embodiment, the latch member 302 is a fixed latch member, which is fixed relative to the connector housing 202 during mating to the panel 102. However, in an alternative embodiment, the latch member 302 may be a deflectable latch member similar to the latch member 300.

The latch member 300 is formed from the flange 234. For example, slots 310 are formed in the flange 234 that surround portions of the latch member 300 and allow the latch member 300 to move relative to the flange 234. The latch member 300 includes a latch arm 312 that extends between a fixed end 314 and a distal end 316. The latch member 300 includes a latching finger 318 at the distal end 316. The latching finger 318 extends forward from the latch arm 312. The latching finger 318 is configured to be received in the panel opening 120 of the panel 102 to latchably secure the latch member 300 to the panel 102. The latch arm 312 is deflectable relative to the connector housing 202. For example, the latch arm 312 may be cantilevered from the fixed end 314. The distal end 316 and the latching finger 318 may be rotated outward during mating with the panel 102. For example, the latch arm 312 may be hinged at the fixed end 314.

In an exemplary embodiment, the flange 234 includes an opening 330 defined by inner surfaces 332. The latch member 300 extends from the flange 234 into the opening 330. For example, the fixed end 314 defines the connection point for the latch member 300 to the flange 234. The latch arm 312 occupies the opening 330. The slots 310 are the portions of the opening 330 surrounding the latch arm 312. The latch member 300 includes a top 320 and a bottom 322 opposite the top 320. The slots 310 are located between the inner surfaces 332 and the top 320, the bottom 322, and the distal end 316. In an exemplary embodiment, the inner surface 332 of the flange 234 is located above the top 320 of the latch member 300 to prevent rotation of the latch arm 312 in the opening 330. For example, the top 320 of the latch member 300 may abut against the inner surface 332 of the flange 234 to prevent rotation of the connector housing 202 relative to the panel 102. Similarly, the inner surface 332 of the flange 234 is located below the bottom 322 of the latch member 300 to prevent rotation of the latch arm 312 in the opening 330. For example, the bottom 322 of the latch member 300 may abut against the inner surface 332 of the flange 234 to prevent rotation of the connector housing 202 relative to the panel 102.

In an exemplary embodiment, the latching finger 318 includes a latching surface 324 configured to engage the inner edge 122 of the panel opening 120 when the electrical connector 200 is in the latched position. The latching finger 318 includes at least one anti-rotation surface different than the latching surface 324. In an exemplary embodiment, the latching finger 318 includes an upper anti-rotation surface 326 at the top of the latching finger 318 and a lower anti-rotation surface 328 at the bottom of the latching finger 318. The anti-rotation surfaces 326, 328 are configured to engage the inner edges 122 of the panel opening 120 to prevent rotation of the connector housing 202 relative to the panel 102.

In an exemplary embodiment, the flange 234 completely surrounds the latch member 300. For example, the latch member 300 is embedded in the flange 234. The flange 234 includes an upper portion 264 above the latch member 300, a lower portion 266 below the latch member 300, and an outer portion 268 outside of the latch member 300. For example, the outer portion 268 is located between the distal end 316 of the latch member 300 and the first side 220 of the flange 234. The outer portion 268 connects the upper portion 264 and the lower portion 266 along the outside of the latch member 300. The structure of the flange 234 provides a solid structure for coupling to the panel 102. Additionally, the structure of the flange 234, surrounding the latch member 300 protects the latch member 300 from damage, such as from catching on surfaces or other items, such as the cable during shipping or assembly.

In an exemplary embodiment, the second latch member 302 includes a latching finger 370 (FIG. 3). The latching finger 370 extends forward of the flange 234, such as at the right flange portion 242. The latching finger 370 may be shaped similar to the latching finger 318. In an exemplary embodiment, the latching finger 370 is fixed relative to the flange 234 (for example, the latching finger 370 is not deflectable relative to the flange 234). In an exemplary embodiment, the latching finger 370 includes a latching surface 374 configured to engage the inner edge 122 of the panel opening 120 when the electrical connector 200 is in the latched position. The latching finger 370 includes at least one anti-rotation surface different than the latching surface 374. In an exemplary embodiment, the latching finger 370 includes an upper anti-rotation surface 376 at the top of the latching finger 370 and a lower anti-rotation surface 378 at the bottom of the latching finger 370. The anti-rotation surfaces 376, 378 are configured to engage the inner edges 122 of the panel opening 120 to prevent rotation of the connector housing 202 relative to the panel 102.

Figure 6:
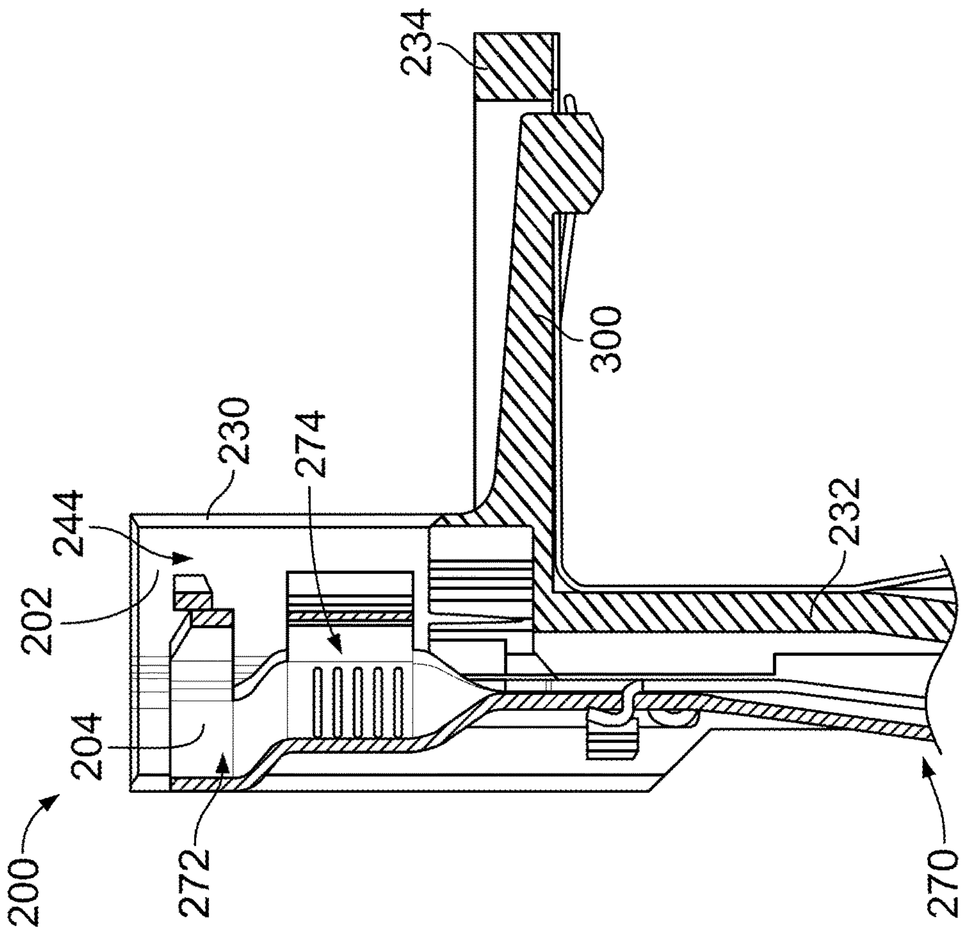
FIG. 6 is a top sectional view of a portion of the electrical connector in accordance with an exemplary embodiment.
Figure 5:
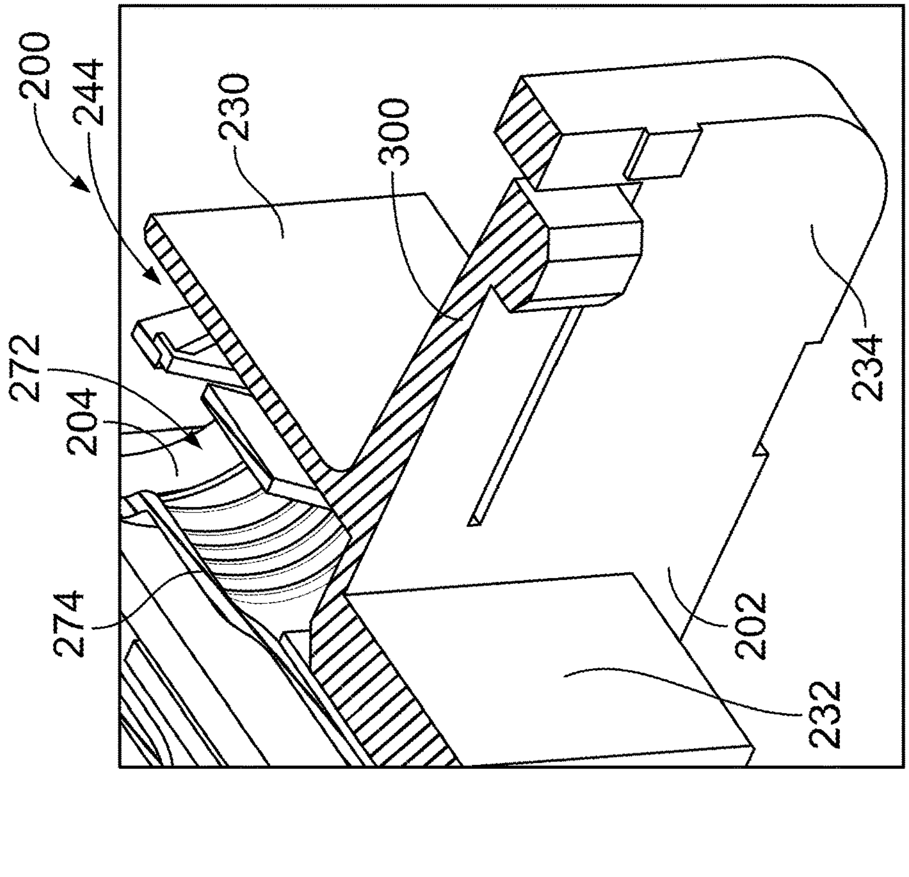
FIG. 5 is a sectional view of a portion of the electrical connector in accordance with an exemplary embodiment.

FIG. 5 is a sectional view of a portion of the electrical connector 200 in accordance with an exemplary embodiment. FIG. 6 is a top sectional view of a portion of the electrical connector 200 in accordance with an exemplary embodiment. FIGS. 5 and 6 illustrate the contact 204 held in the connector housing 202. The contact 204 is received in the contact channel 244.

The contact 204 includes a mating end 270 at a front of the contact 204 and a terminating end 272 at a rear of the contact 204. The mating end 270 extends into the plug 232 of the connector housing 202. The mating end 270 is configured to be mated with the mating electrical connector 104 (shown in FIG. 1). The terminating end 272 is configured to be terminated to the cable 206 (shown in FIG. 2). In the illustrated embodiment, the terminating end 272 includes a crimp barrel 274 configured to be crimped to the end of the cable 206. Other types of terminations may be provided at the terminating end 272 in alternative embodiments, such as a weld pad, an insulation displacement contact, and the like. In the illustrated embodiment, the terminating end 272 is located in the base 230 of the connector housing 202.

The latch member 300 is located outside of the base 230 and the plug 232. For example, the latch member 300 is provided in the flange 234. In an exemplary embodiment, a portion of the flange 234 is located outside of the latch member 300 such that the latch member 300 is completely surrounded by the flange 234. As such, the latch member 300 is protected from damage, such as from catching on surfaces or other items, such as the cable during shipping or assembly.

Figure 7:
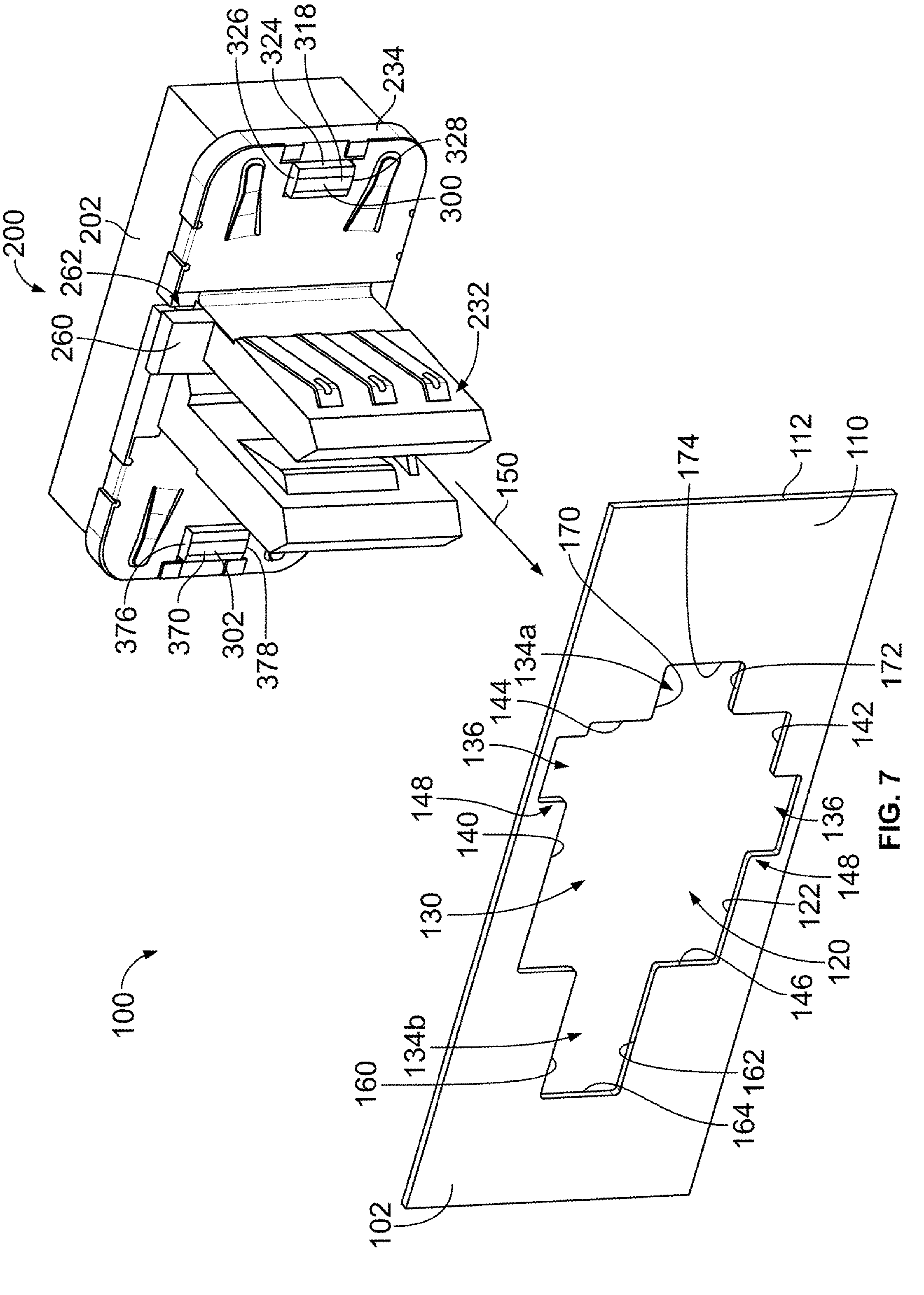
FIG. 7 illustrates the electrical connector system showing the electrical connector poised for mounting to the panel with an exemplary embodiment.
Figure 8:
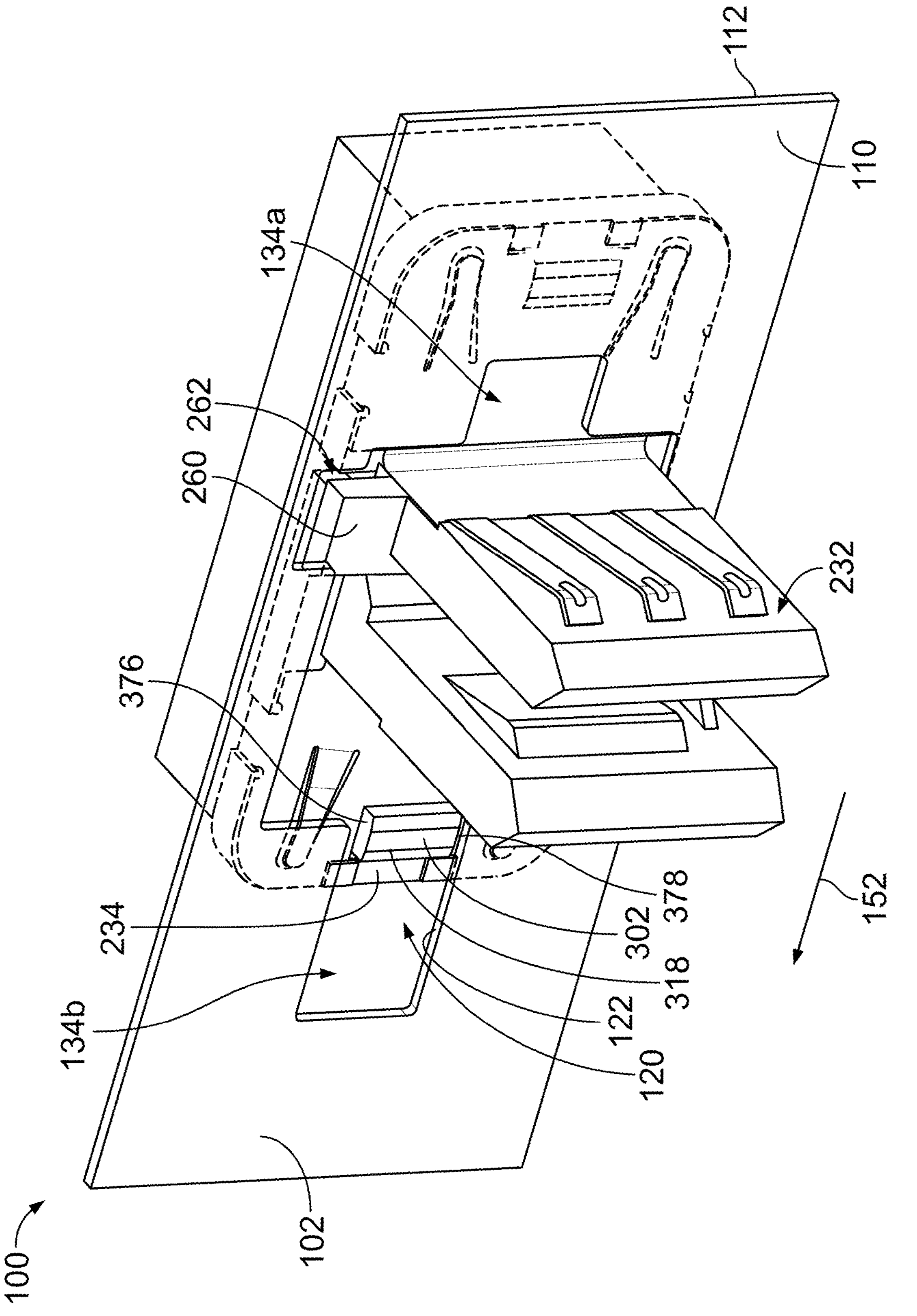
FIG. 8 illustrates the electrical connector system showing the electrical connector partially mated to the panel with an exemplary embodiment.

FIG. 7 illustrates the electrical connector system 100 showing the electrical connector 200 poised for mounting to the panel 102. FIG. 8 illustrates the electrical connector system 100 showing the electrical connector 200 partially mated to the panel 102. FIGS. 7 and 8, and with additional reference to FIG. 1, illustrate an exemplary mounting procedure for mounting the electrical connector 200 to the panel 102. In an exemplary embodiment, the electrical connector 200 is a slide-to-latch electrical connector configured to be initially loaded through the panel opening 120 in a loading direction 150 (shown FIG. 7) to a nominal position (FIG. 8) and then slid in a latching direction 152 (shown in FIG. 8) to a latched position (FIG. 1). The loading direction 150 is generally a forward direction. The latching direction 152 is generally a sideways sliding direction (for example, from right to left in the illustrated view).

During initial loading, the connector housing 202 is rear loaded into the panel opening 120 from behind the panel 102. The plug 232 of the connector housing 202 is loaded into the main pocket 130 of the panel opening 120. The main pocket 130 is oversized relative to the plug 232 to receive the plug 232 and allow the plug 232 to slide sideways in the main pocket 130 from the nominal position (FIG. 8) to the latched position (FIG. 1). In an exemplary embodiment, the inner edges 122 defining the main pocket 130 include an upper edge 140, a lower edge 142, and side edges 144, 146. The side edges 144, 146 have a width greater than the width of the plug 232 to allow the sideways sliding movement from the nominal position to the latched position. Optionally, the upper edge 140 and the lower edge 142 have a height therebetween approximately equal to a height of the plug 232 to limit up and down movement of the plug 232 within the main pocket 130. The upper edge 140 and the lower edge 142 guide the sliding movement of the connector housing 202 from the nominal position to the latched position.

In an exemplary embodiment, the tab pockets 136 are provided above and below the main pocket 130. For example, notches are formed in the upper edge 140 and the lower edge 142 to form the tab pockets 136. The tab pockets

136 are open to the main pocket 130. In an exemplary embodiment, the upper and lower tab pockets 136 are offset from each other. Alternatively, the upper and lower tab pockets 136 may be aligned with each other on opposite sides of the main pocket 130. The tab pockets 136 receive the front tabs 260 of the connector housing 202. The front tabs 260 are loaded through the panel opening 120 through the tab pockets 136. In the nominal position (FIG. 8), the front tabs 260 are aligned with the tab pockets 136 and located forward of the tab pockets 136. In the latched position (FIG. 1) the front tabs 260 are offset from the tab pockets 136.

In an exemplary embodiment, the panel 102 includes a retention tab 148 located immediately adjacent the corresponding tab pocket 136. The retention tab 148 is positioned to the side of the tab pocket 136 and the direction that the electrical connector 200 slides from the nominal position to the latched position. The front tabs 260 are aligned with, and engage, the retention tabs 148 when the electrical connector 200 is slid sideways from the nominal position. The retention tab 148 is configured to be received in the gap 262 between the front tab 260 and the flange 234. The retention tab 148 is captured between the front tab 260 and the flange 234. The retention tab 148 prevents removal of the electrical connector 200 from the panel 102. For example, the front tab 260 engages the front surface 110 of the panel 102 along the retention tab 148 to prevent removal of the electrical connector 200 from the panel opening 120. The flange 234 engages the rear surface 112 of the panel 102 to prevent removal of the electrical connector 200 and through the panel opening 120.

In an exemplary embodiment, the latch pockets 134 are provided at the left side and the right side of the main pocket 130. For example, notches are formed in the side edges 144, 146 to form the latch pockets 134. The latch pockets 134 are open to the main pocket 130. In the illustrated embodiment, the latch pockets 134 include a first latch pocket 134*a* and a second latch pocket 134*b*. The first latch pocket 134*a* receives the first latch member 300. The second latch pocket 134*b* receives the second latch member 302. In an exemplary embodiment, the second latch member 302 is received in the second latch pocket 134*b* in the nominal position (FIG. 8) and slides sideways in the second latch pocket 134*b* to the latched position (FIG. 1). In the illustrated embodiment, the second latch member 302 is a fixed latch member; however, the second latch member 302 may be a deflectable latch member in alternative embodiments. In such embodiment, the second latch member 302 may be latched into a different panel opening in the panel 102. The second latch pocket 134*b* includes an upper edge 160, a lower edge 162, and a side edge 164. The upper anti-rotation surface 376 of the latching finger 370 faces the upper edge 160 and may engage the upper edge 160 to prevent rotation of the electrical connector 200 relative to the panel 102. The lower anti-rotation surface 378 of the latching finger 370 faces the lower edge 162 and may engage the lower edge 162 to prevents rotation of the electrical connector 200 relative to the panel 102. The upper and lower edges 160, 162 may guide the latching finger 370 as the electrical connector 200 is slid sideways from the nominal position to the latched position.

In an exemplary embodiment, in the nominal position (FIG. 8) the latching finger 318 of the first latch member 300 is located behind the rear surface 112 of the panel 102. The latch member 300 is deflected rearward as the flange 234 of the connector housing 202 presses against the rear surface 112 of the panel 102. For example, because the latching finger 318 extends forwardly, when the outer surface of the latching finger 318 engages the rear surface 112 of the panel 102, the latch arm 312 is deflected rearwardly. The electrical connector 200 is slid sideways from the nominal position to the latched position (FIG. 1). In the latched position, the latching finger 318 is aligned with the latch pocket 134*a*. The latch member 300 snaps forward to position the latching finger 318 in the latch pocket 134*a*. The latch finger 318 engages the inner edge 122 defining the latch pocket 134*a* to latchably couple the electrical connector 200 to the panel 102. The latching surface 324 engages the inner edge 122 to prevent sliding of the electrical connector 200 in the opposite direction (for example, toward the nominal position).

In an exemplary embodiment, the first latch pocket 134*a* includes an upper edge 170, a lower edge 172, and a side edge 174. The latching surface 324 engages the side edge 174 to prevent sliding of the electrical connector 200 relative to the panel 102. The upper anti-rotation surface 326 of the latching finger 318 faces the upper edge 170 and may engage the upper edge 170 to prevent rotation of the electrical connector 200 relative to the panel 102. The lower anti-rotation surface 328 of the latching finger 318 faces the lower edge 172 and may engage the lower edge 172 to prevent rotation of the electrical connector 200 relative to the panel 102.

The electrical connector 200 is latchably coupled to the panel 102 in the latched position. The electrical connector 200 is mounted to the panel 102 without the use of tools or mounting hardware. In an exemplary embodiment, the electrical connector 200 is a slide-to-latch electrical connector configured to be loaded through the panel opening 120 to a nominal position and then slid in a latching direction to a latched position. Integral features of the electrical connector 200, such as the latch members 300, engage the panel 102 to secure the electrical connector 200 to the panel 102.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112 (f), unless and until such claim limitations expressly use the phrase "means for" followed by a statement of function void of further structure.

What is claimed is:

1. An electrical connector for mounting to a panel, the electrical connector comprising:

a connector housing having a base at a rear of the connector housing, a flange extending from the base, and a plug extending forward of the base and the flange at a front of the connector housing for mating with a mating electrical connector, the connector housing having a contact channel through the base and the plug;

a contact received in the contact channel, the contact having a mating end and a cable end, the cable end of the contact configured to be terminated to a cable;

a latch member integral with the connector housing and located within the flange for latchably coupling to the panel, the latch member including a latch arm located within the flange being deflectable relative to the connector housing, the latch member including a latching finger extending forward from the latch arm to be received in a latch pocket of the panel to latchably couple the latch member with the panel;

wherein the plug of the connector housing is configured to be inserted into a panel opening of the panel in a loading direction, the connector housing being movable laterally relative to the panel in a latching direction to a latched position, the latching direction differing from the loading direction, the plug movable in the panel opening in the latching direction, the latching finger engages an inner edge of the panel opening when the housing is in the latched position to hold the connector housing in the latched position.

2. The electrical connector of claim 1, wherein the flange surrounds the latch member.

3. The electrical connector of claim 1, wherein the flange includes an opening, the latch arm located in the opening and movable relative to the flange in the opening.

4. The electrical connector of claim 1, wherein the latch member includes a top, a bottom, a fixed end, and a distal end opposite the fixed end, the fixed end positioned closer to the base than the distal end, the fixed end extending from the flange, the flange surrounding the top, the bottom, and the distal end.

5. The electrical connector of claim 1, wherein the latching finger extends forward of the flange for reception in the panel opening of the panel.

6. The electrical connector of claim 1, wherein the latching finger includes a latching surface configured to engage the inner edge of the panel opening in the latched position, the latching finger including at least one anti-rotation surface different than the latching surface configured to engage the inner edge of the panel opening in the latched position, the at least one anti-rotation surface preventing rotation of the connector housing relative to the panel.

7. The electrical connector of claim 1, wherein the flange is provided at a first side and a second side of the connector housing, the latch member provided at the first side, the electrical connector further comprising a second latch member at the second side.

8. The electrical connector of claim 7, wherein the second latch member includes a second latch arm being deflectable relative to the connector housing.

9. The electrical connector of claim 1, wherein the connector housing includes a front tab configured to pass through the panel opening to engage a front surface of the panel, the flange configured to engage a rear surface of the panel, the connector housing being configured to capture the panel between the front tab and the flange.

10. The electrical connector of claim 9, wherein the front tab is an upper front tab at a top of the connector housing, the connector housing further comprising a lower front tab at a bottom of the connector housing.

11. The electrical connector of claim 1, wherein the connector housing is manufactured from a dielectric material, the latch member being manufactured from the same dielectric material as the connector housing.

12. The electrical connector of claim 11, wherein the connector housing and the latch member are co-molded using the dielectric material.

13. The electrical connector of claim 1, wherein the plug includes a slot configured to receive a bus bar.

14. An electrical connector system comprising:

a panel having an inner edge defining a panel opening, the panel opening including a main pocket and a latch pocket extending from the main pocket; and an electrical connector mounted to the panel, the electrical connector including a connector housing having a base at a rear of the connector housing, a flange extending from the base, and a plug extending forward of the base and the flange at a front of the connector housing for mating with a mating electrical connector, the connector housing having a contact channel through the base and the plug, the electrical connector including a contact received in the contact channel having a mating end and a cable end configured to be terminated to a cable, the electrical connector including a latch member integral with the connector housing and located within the flange for latchably coupling to the panel, the latch member including a latch arm located within the flange being deflectable relative to the connector housing, the latch member including a latching finger extending forward from the latch arm to be received in a latch pocket of the panel to latchably couple the latch member with the panel;

wherein the plug of the connector housing is inserted into the main pocket of the panel opening in a loading direction, the connector housing being movable laterally relative to the panel in a latching direction to a latched position, the latching direction differing from the loading direction, the plug movable in the main pocket in the latching direction, the latching finger being received in the latch pocket in the latched position and engaging the inner edge of the panel opening in the latched position to hold the connector housing in the latched position.

15. The electrical connector system of claim 14, wherein the latching finger slides along a rear surface of the panel as the connector housing is moved from the loaded position to the latched position, the latching finger moving forwardly into the latch pocket when in the latched position.

16. The electrical connector system of claim 14, wherein the latch pocket is at a first side of the main pocket, the panel opening including a second latch pocket at a second side of the main pocket, the electrical connector including a second latch member received in the second latch pocket.

17. The electrical connector system of claim 14, wherein the flange surrounds the latch member, the flange engaging a rear surface of the panel around the inner edge defining the latch pocket.

18. The electrical connector system of claim 14, wherein the flange includes an opening, the latch arm located in the opening and movable relative to the flange in the opening.

19. The electrical connector system of claim 14, wherein the latch member includes a top, a bottom, a fixed end, and a distal end opposite the fixed end, the fixed end positioned closer to the base than the distal end, the fixed end extending from the flange, the flange surrounding the top, the bottom, and the distal end.

20. The electrical connector system of claim 14, wherein the latching finger extends forward of the flange for reception in the latch pocket of the panel opening.

* * * * *